United States Patent Office.

THEODORE D. TEAL, OF PHILADELPHIA, PENNSYLVANIA.

Letters Patent No. 99,497, dated February 1, 1870; antedated January 24, 1870.

IMPROVED PAINT FOR SHIPS' BOTTOMS.

The Schedule referred to in these Letters Patent and making part of the same.

To all whom it may concern:

Be it known that I, THEODORE D. TEAL, of the city and county of Philadelphia, and State of Pennsylvania, have invented a new and improved "Paint for Vessels' Bottoms;" and I do hereby declare that the following is a full, clear, and exact description of the ingredients and proportions used, and the mode of preparing the same.

The object of my invention is to preserve the wood of vessels' bottoms, and prevent their fouling, by accumulations of sea-weed and barnacles.

To enable those skilled in the art to make and use my invention, I will now proceed to describe its composition.

I first make a chemical oil especially for this purpose, which consists of one hundred and twenty-five gallons of whale-oil, ten pounds of litharge, ten pounds powdered white copperas, five gallons linseed-oil, one gallon turpentine, and sixteen gallons of vinegar. To this oil I add five gallons of naphtha, and mix them thoroughly. I then take, of zinc ground in oil, fifty pounds, and add sufficient of my chemical oil to it to make it fluid. The zinc is then poured into one hundred gallons of tar, and mixed with it. I now take the chemical oil, containing the naphtha, and thoroughly incorporate it with the mixture of tar and zinc, and the paint is then ready for use.

I do not wish to limit myself to the exact proportions set forth, as more or less of each of the specified ingredients may be used.

Having thus described my invention,

What I claim, and desire to secure by Letters Patent, is—

The composition herein set forth, prepared in the manner and for the purpose specified.

In testimony whereof, I have hereunto signed my name, in the presence of two subscribing witnesses.

THEODORE D. TEAL.

Witnesses:
CHARLES H. EVANS,
ISAAC R. OAKFORD.